United States Patent [19]

Watson

[11] Patent Number: 4,701,894
[45] Date of Patent: Oct. 20, 1987

[54] MAGNETIC BIASING APPARATUS FOR MAGNETO-OPTIC RECORDING INCLUDING A MAGNETIC CIRCUIT

[75] Inventor: Edwin G. Watson, Camden County, N.J.

[73] Assignee: RCA Corporation, Princeton, N.J.

[21] Appl. No.: 845,194

[22] Filed: Mar. 28, 1986

[51] Int. Cl.$^4$ .................. G11B 5/03; G11B 13/04; G11B 11/14
[52] U.S. Cl. ..................... 369/13; 360/114; 365/122
[58] Field of Search ............ 369/13; 360/114, 59, 360/118, 60; 365/122

[56] References Cited

U.S. PATENT DOCUMENTS

| 1,866,631 | 7/1932 | Dorff et al. | 365/122 |
| 2,984,825 | 5/1961 | Fuller et al. | 365/122 |
| 3,696,346 | 10/1972 | Zook | 365/122 |
| 3,775,570 | 11/1973 | Lewicki et al. | 360/114 |
| 4,097,895 | 6/1978 | Spong | 369/275 |
| 4,410,277 | 10/1983 | Yamamoto et al. | 356/366 |
| 4,477,852 | 10/1984 | Ota et al. | 360/114 |
| 4,495,530 | 1/1985 | Yanagida | 360/59 |
| 4,497,006 | 1/1985 | Deguchi et al. | 360/114 |
| 4,520,472 | 5/1985 | Reno | 369/112 |

FOREIGN PATENT DOCUMENTS

| 57-94906 | 6/1982 | Japan | 369/13 |
| 59-119507 | 7/1984 | Japan | 360/114 |
| 60-147950 | 8/1985 | Japan | 360/114 |

OTHER PUBLICATIONS

Barrekette et al., the IBM Tech. Dis. Bulletin, vol. 6, No. 4, Sep. 1963, pp. 145–146.

Primary Examiner—Raymond F. Cardillo
Assistant Examiner—Hoa T. Nguyen
Attorney, Agent, or Firm—Clement A. Berard, Jr.; William H. Meise; C. L. Maginniss

[57] ABSTRACT

A magneto-optic disc recording system includes an E-shaped electromagnet for providing magnetic biasing selectively for the recording and erasing processes. The middle arm of the E comprises a first pole piece and is positioned radially with respect to the disc rotation, on the opposite side of the disc from, but aligned with, the path of radial motion of the focused recording/erasing light beam. The other arms of the E, parallel to the middle arm, comprise second pole pieces opposite in polarity from the first pole piece, and are positioned adjacent the disc recording surface on the opposite side of the disc from the middle arm. Two shoes of a magnetic material, coupled to the optical translation stage, provide a magnetic circuit between the respective second pole pieces and the area surrounding the objective lens focusing light on the disc recording surface, relaying a substantially vertical magnetic field through the disc at the point of incidence of the focused light beam. The density of magnetic flux at the point of incidence is increased by (a) incorporating a ring of a magnetic material on the barrel of the objective lens, thus relaying flux from the shoes to a position more vertically oriented with respect to the point of incidence; and (b) forming a narrow ridge along the first pole piece directly opposite the path of radial motion of the focused light beam, thereby concentrating the flux path through the point of incidence.

19 Claims, 7 Drawing Figures

MAGNETIC BIASING APPARATUS FOR MAGNETO-OPTIC RECORDING INCLUDING A MAGNETIC CIRCUIT

The U.S. Government has rights in this invention pursuant to a Government Contract.

This invention relates generally to magneto-optic recording systems and, more particularly, to an apparatus for providing a magnetic field at the recording region of a rotating disc, wherein the apparatus includes a magnetic circuit to relay the magnetic flux to the recording head.

BACKGROUND OF THE INVENTION

High density optical recording systems which may be used for recording and playing back information are known in the prior art. For example, U.S. Pat. No. 4,097,895, entitled "MULTI-LAYER OPTICAL RECORD," issued on June 27, 1978, to F. W. Spong, relates to an optical disc record/playback system wherein data are recorded on the surface of a recording medium. In a Spong system the thermal energy of a focused high intensity light beam causes variation in the optical properties on the surface of the recording medium. For example, in one system the thermal effects of a laser beam form pits in an absorptive coating on the surface of an optical disc. In the Spong system, approximately $10^{11}$ bits of information can be recorded on one side of a disc-shaped record medium having a thirty centimeter diameter.

Although the system of the previous example is directed toward archival, or permanent, storage, there have developed in recent years erasable media and recording techniques. Currently, magneto-optic materials are used in the state-of-the-art recording media to effect readily alterable recordings. A magneto-optic recording medium is a magnetic material which causes the polarization angle of laser light to be changed when reflected from a recorded spot. Preparatory to recording or playback operation, the molecules of the magneto-optic material across the entire recording surface are vertically oriented in one direction. During recording, the molecules of the magneto-optic material at the point of incidence of a laser beam are flipped in the opposite direction due to the presence of a vertical magnetic field of a given strength and polarity and the heating induced by the laser. Illumination from a playback laser beam of lower power reflected from this area will show a polarization angle change. The erasing process then restores the molecular orientation condition which existed prior to recording by the use of a vertical magnetic field of polarity opposite to that used for recording in the presence of a continuous wave laser beam.

The present invention address the problem of providing a reversible, vertically-oriented magnetic field in the region of the recording surface at the point of incidence of the laser beam. Traditionally, an electromagnet in which current (and, thus, the induced field) can be adjusted and reversed, has been the preferred source for generating a magnetic bias. Because of the very close proximity between the objective lens of the record/playback optics, however, there is very little space on the recording side of the disc for an electromagnet capable of providing a vertical magnetic field at the point of incidence, without expending large amounts of power, typically in excess of 15 watts.

There are also, however, disadvantages to backside magnetic biasing devices, those devices which apply a magnetic field from the reverse side of the disc opposite the recording/erasing beam. Because backside magnetic bias devices typically use air return paths resulting in high gradients of magnetic flux density through the disc, large amounts of power, in the order of 15-20 watts, are required to generate sufficient strength of a vertical magnetic field, typically 300 oersteds at the point of incidence of the recording/erasing beam.

The problems of a backside magnetic biasing device are compounded in the case where the disc has magneto-optic recording media on both surfaces, as where two single-sided discs are combined, resulting in a double-thickness, double-sided disc. The gradient of magnetic flux density is even greater through the double-thickness disc, and in order to provide the necessary field strength at the recording surface remote from the biasing device, the field intensity at the surface adjacent the biasing device may be sufficient to inadvertantly alter the data recorded thereon, even without the presence of laser heating.

SUMMARY OF THE INVENTION

In accordance with the principles of the present invention, an apparatus is disclosed for use in an optical system for recording information on a disc-shaped record medium, the record medium having a first surface for recording information thereon, and having a second surface opposite the first surface. The system includes drive means for rotating the record medium about a central axis normal to the first surface. The system additionally includes source means for providing a focused beam of light incident on the recording surface, and means for establishing radial relative motion between the light beam and the recording surface. The disclosed apparatus generates a magnetic field at the recording surface adjacent the focused light beam. The apparatus comprises an electromagnet having first and second pole pieces. The first pole piece comprises a first arm extending radially of the disc, positioned adjacent the second surface of the disc and aligned with the path of motion described by the focused light beam. The second pole piece comprises a second arm, positioned adjacent the first surface of the disc on the opposite side of the disc from the first arm, the second arm being parallel to the first arm, and offset from the path of motion described by the focused light beam. The apparatus additionally comprises a relaying member, fabricated of a magnetic material, coupled to the means for establishing radial motion. The relaying member is positioned in close sliding relation to the second arm. The relaying member relays magnetic flux between the second pole piece and a position adjacent the focused light beam, wherein magnetic flux relayed by the relaying member passes substantially vertically between the relaying member and the first pole piece through the disc at the point of incidence on the first surface of the focused light beam. Finally, the apparatus comprises source means for supplying an electrical current to the elctromagnet to thereby provide opposing magnetic polarities in the first and second pole pieces.

DETAILED DESCRIPTION OF THE PREFERRED EMBODIMENT

Figure 1:
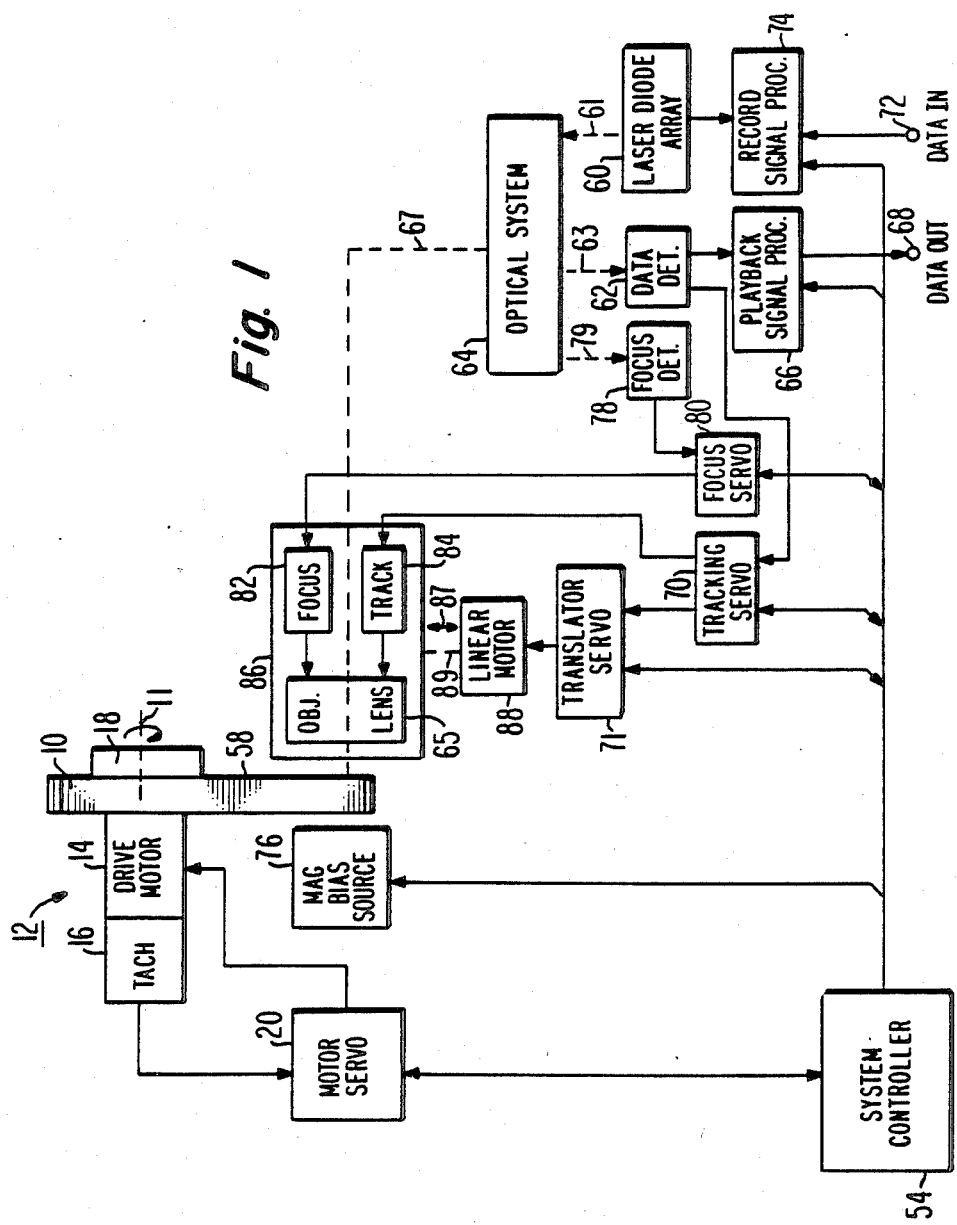
FIG. 1 illustrates, via a block diagram representation, a functional description of the optical information recording and playback system in which the present invention is embodied.

Referring to FIG. 1, there is shown a functional block diagram of the optical information recording and playback system in which the present invention is embodied. In operation, disc 10 is placed on turntable 12 which includes drive motor 14, tachometer 16 and hold-down mechanism 18 by which disc 10 is held in place. Disc 10 may typically comprise an aluminum substrate having a recording surface comprising a magneto-optic coating, such as a 5086-T6 alloy used in Winchester-type discs. After disc 10 is rigidly clamped to turntable 12, drive motor 14 is activated to rotate disc 10 about its central axis 11 at a predetermined angular speed, as measured by tachometer 16. Drive motor 14, which may typically be a brushless dc motor, is controlled by servo system 20 and includes tachometer 16 for the servo loop. Tachometer 16 may typically be an optical tachometer.

In the preferred embodiment of the present invention, the rate at which information is processed by recording on or playing back from the disc is enhanced by techniques of recording and playing back multiple tracks of information simultaneously. Multi-track recording is well known in the art and is described for use with magneto-optic media in U.S. patent application Ser. No. 803,003, filed Nov. 29, 1985, and assigned to the same assignee as the present invention. The above-cited reference describes a system in which a nine-element laser diode array includes eight elements for recording and playing back data, and one element for tracking on a preformatted, permanent pilot track. Such an array may be of the type disclosed in U.S. Pat. No. 4,520,472, issued May 28, 1985, to C. W. Reno.

Referring again to FIG. 1, the light from light source 60, which may be an array of nine diodes of the Reno type, is fed via optical path 61 into optical system 64 and from there, via optical path 67, into objective lens 65, where the nine beams are focused as diffraction-limited spots on recording surface 58 of disc 10. In the present example, recording surface 58 includes a magneto-optic layer. The beam focusing elements of optical system 64 and lens 65 may be similar to those disclosed in the Reno patent. The process of recording data on surface 58 includes receiving a stream of input data from a data source at input terminal 72 which is applied to recording signal processor 74. Under the supervision of system controller 54, processor 74 supplies eight signals to laser diode array 60 which are modulated in accordance with an encoded version of the input data received at terminal 72. The eight modulated signals drive the eight data recording diodes of array 60. The pilot tracking diode of array 60 is never modulated; it operates in a continuous wave mode during both record and playback operation.

During the recording and erasing processes magnetic bias source 76, which is the subject matter of the present invention, acting under the control of system controller 54, provides a magnetic field in the area of disc 10 where the recording or erasing process is taking place, i.e., in close proximity to objective lens 65. The direction of the magnetic field determines whether a recording or erasing process is being effected. A detailed discussion of the magneto-optic recording, retrieving and erasing processes, used in the preferred embodiment, is provided in later paragraphs in conjunction with FIGS. 2–5.

During playback, diode array 60 provides nine, low-power, continuous wave beams directed onto the eight data tracks and one pilot track of disc surface 58 via optical path 61, optical system 64, optical path 67 and objective lens 65. A nine element detector 62 is responsive to the optical signals reflected from surface 58 and received through objective lens 65 and optical system 64, and via optical paths 67 and 63, to read the data recorded in eight tracks on surface 58 and also to detect the pilot track information. The eight detected data streams from detector 62 are applied to a playback signal processor 66 which, under the supervision of the system controller 54, generates a decoded stream of user output data at output terminal 68. The remaining information bit stream detected by data detector 62, read from the pilot track, is used to generate a tracking error signal which is applied to tracking servo 70.

A second data detector, focus detector 78, monitors information on recording surface 58, received via optical path 79, and determines therefrom the focal quality of the spots imaged by the objective lens 65 and optical system 64. Focus error signals are generated by detector 78 to focus servo 80.

It has been shown that a tracking error signal, generated by data detector 62, and a focus error signal, generated by focus detector 78, have been coupled, respectively, to tracking servo 70 and focus servo 80. These two servos, under the supervision of system controller 54, and in conjunction with a translator servo 71 controlling the motion of linear motor 88, produce three movements of the optical system so as to keep the beams from laser diode array 60 focused on their respective tracks. Focus servo 80 activates focus actuator 82 which induces motion of objective lens 65 toward or away from recording surface 58. Focus actuator 82 may typically be a voice coil which responds to an electrical signal to induce motion in a diaphragm to which objective lens 65 is coupled.

Tracking servo 70 generates two signals, both of which cause motion of objective lens 65 radially with respect to disc 10. A fine tuning tracking signal is applied to tracking actuator 84, which may typically be a galvonometer-controlled mirror, providing very fine adjustments to the positions of the laser diode beams directed onto recording surface 58. This fine tracking signal is typically an analog signal which drives tracking actuator 84 to a position which depends on the amount of current supplied by drive amplifiers in tracking servo 70. In the preferred embodiment, the functions of focus actuator 82 and tracking actuator 84 are combined in a single device, e.g., a two-axis focus lens actuator.

A coarse tracking signal from tracking servo 70 is applied via translator servo 71 to linear motor 88 which is coupled to optical platform 86 via mechanical linkage 89 and which causes motion of platform 86 radially with respect to disc 10 as shown by double-headed arrow 87. This coarse tracking signal is used to drive optical platform 86 to a desired track and also, in response to the current drive provided by tracking servo 70 to tracking actuator 84, causes linear motor 88 to drive platform 86 to a position which locates the center of the tracking actuator's field of view on the pilot track. Optical platform 86 is a structure on which are located objective lens 65, focus actuator 82 and tracking actuator 84.

System controller 54 comprises a stored-program processor which may typically be a microprocessor. It provides system control by generating signals to and receiving signals from the several subsystems of the recording/playback system. Controller 54 may typically command servo 20 to activate motor 14, and servo 20 may respond with status signals indicating, for example, servo out-of-lock or overspeed. System controller 54 may typically generate a command to magnetic bias source 76 indicating direction and magnitude of the magnetic field. Controller 54 may typically command translator servo 71 to drive linear motor 88 to a specified track address, and may request track address status of servo 71. Controller 54 may typically command tracking servo 70 to jump a track or lock on a track, and may request status information from servo 70 concerning whether the limit of tracking actuator 84 has been exceeded. Finally, controller 54 may command focus servo 80 to drive focus actuator 82 into focus, and may request status information from servo 80 as to whether focus has been achieved.

In the system illustrated in FIG. 1, the preferred erasable disc media uses a magneto-optic process based on the Kerr effect to record and playback information. The Kerr effect operates on light reflected from a magnetized material to rotate its angle of polarization. The amount of change and sign of the angular change are dependent on the material and the direction of the magnetic field. The magneto-optic record, playback and erase processes are illustrated in FIGS. 2, 3, 4 and 5.

Figure 2:
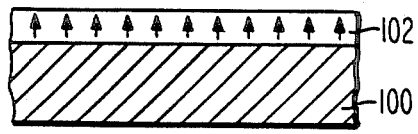
FIGS. 2, 3, 4 and 5 illustrate the magneto-optic processes used in the system of FIG. 1.
Figure 3:
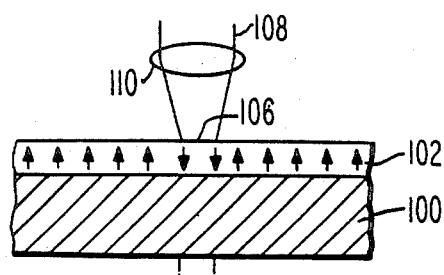

Referring to FIG. 2, there is shown disc 100 in cross-sectional view, with a thin, magneto-optic recording layer.102. Layer 102 is a vertically oriented magnetic material and, as shown in FIG. 2, is unrecorded. Recording is effected as shown in FIG. 3: magnetic bias source 104 produces a magnetic field H directed oppositely to the magnetic orientation of layer 102. When a spot 106 in the area influenced by the external magnetic field H is heated, as, for example, by a high power laser beam 108 focused by objective lens 110, the coercivity of the magnetic material of layer 102 decreases such that the magnetic vectors within layer 102 will align with the relatively weak external magnetic field H in heated region 106 produced by magnetic bias source 104. Therefore, the direction of the resulting local magnetic vector in sensitive layer 102 is determined by the direction of the applied external magnetic field H, and the size of this recorded feature is determined by the size of the focused spot 106.

Figure 4:
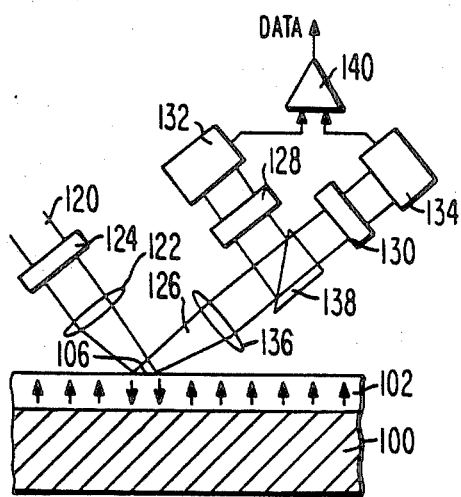

As shown in FIG. 4, recorded information is read by reflecting a linearly polarized light beam from the surface of the sensitive layer. A low-power, continuous wave laser beam 120 is focused onto recorded spot 106 by objective lens 122 and linearly polarized by polarizer 124. Upon reflection from the surface, a very small polarization rotation of the reflected beam 126, based upon the Kerr effect, is produced and its direction is dependent upon the orientation of the magnetic vectors in the area of layer 102 illuminated by beam 120.

The data readout signal is derived via differential detection of the polarization rotation. Reflected beam 126 is collected by collection lens 136, partially reflected by beam splitter 138, and passed through polarizers 128 and 130 whose polarization angles are at 90° to each other. The effect of the two polarizers 128, 130 on the reflected beam is to differentially vary the intensity of light passing therethrough depending on the polarization rotation of the reflected beam; i.e., as the beam illuminating layer 102 traverses between recorded and unrecorded spots, the amount of light energy passing through the two polarizers 128 and 130 varies in differential relation one to the other. The amplitudes of the optical signals passing through polarizers 128 and 130 are detected by detectors 132 and 134, respectively, and their output signals are compared by differential amplifier 140. The polarization rotation due to the magneto-optic recording process is very small, typically between one-half and two degrees.

Figure 5:
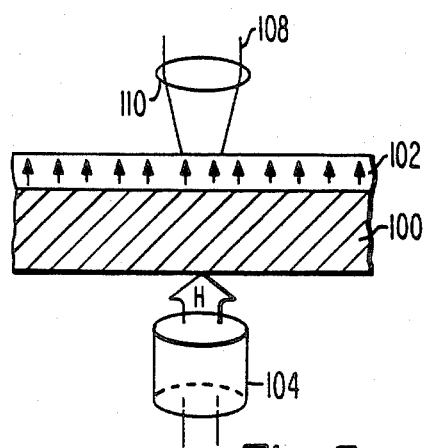

Erasure of the recording layer 102 is effected, as shown in FIG. 5, by reversing the external magnetic field H provided by magnetic bias source 104, and heating the recorded areas of layer 102 by the application of heat from high power laser beam 108, in a continuous wave mode, focused by objective lens 110. If the coercivity of the magnetic material of recording layer 102 is sufficiently small, or if the intensity of the magnetic field H is sufficiently large, erasure of the disc 100 may be accomplished merely by saturation with the magnetic field H of magnetic bias source 104 directed as shown in FIG. 5.

Figure 6:
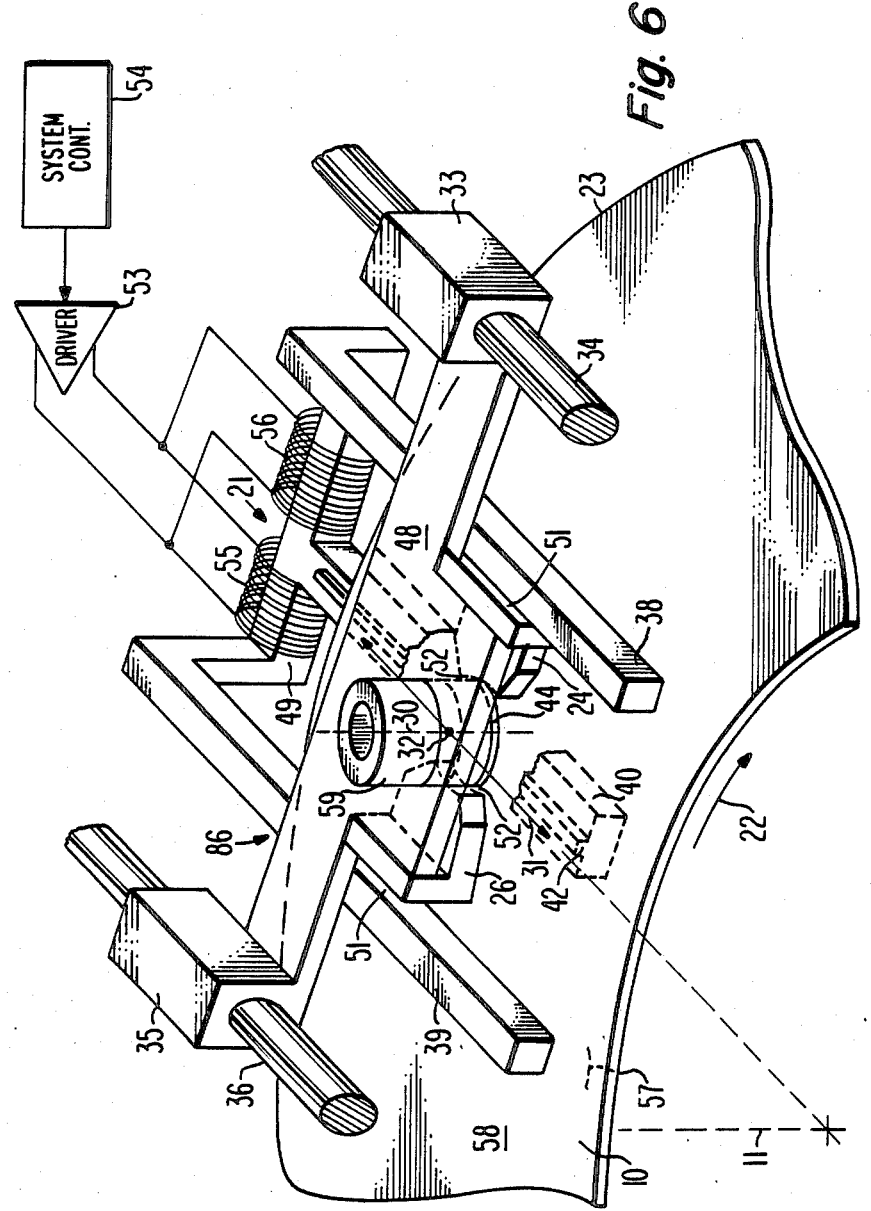
FIG. 6 illustrates a magnetic biasing device for use in the system of FIG. 1, according to the preferred embodiment of the present invention.

Referring to FIG. 6, there is shown a portion of the magneto-optic recording/playback system of FIG. 1, including a magnetic biasing system according the the preferred embodiment of the present invention. Disc 10 rotates about axis 11 in a direction shown by arrow 22. Located above recording surface 58 of disc 10 is optical platform 86, including support frame 48 and objective lens assembly 59. Optical platform 86 moves radially with respect to disc 10 such that light beams 30 passing through objective lens assembly 59 and incident at point 32 describe a path of motion 31 on surface 58 of disc 10.

Optical platform 86 is driven radially upon stationary rails 34 and 36 by linear transport systems which may be included within bearing blocks 33 and 35, respectively. The driving means within blocks 33 and 35 preferably include linear motors. Bearing blocks 33 and 35 may also include means for providing a bearing surface, as, for example, a film of compressed air about rails 34 and 36.

The magnetic biasing system of FIG. 6 comprises a generally E-shaped electromagnet 21 including arms 38 and 39 in one plane and center arm 40 in a second plane, with connecting bar 49 connecting the three arms. The biasing system further includes coils 55 and 56 and current driver 53. Coils 55 and 56 are wound around connecting bar 49 in such a direction and their terminal leads interconnected such that current supplied from current driver 53 causes arm 40 to be one pole piece and arms 38 and 39 to comprise second pole pieces, having polarity opposite that of arm 40.

The electromagnet 21 is rigidly mounted (in a manner not shown) and is positioned with respect to disc 10 such that arm 40 is directed radially inward toward the center of rotation 11 of disc 10, adjacent surface 57 of disc 10, opposite the surface on which recording is being effected, with the arms 38 and 39 extending adjacent the opposite recording surface 58 of disc 10. Arm 40 is parallel to surface 57 and is aligned with the path of motion 31 of the point of incidence 32 of focused light beams 30. Arm 40 includes ridge 42 extending along the length of arm 40 adjacent surface 57. Ridge 42 is aligned with the path of motion 31. The function of ridge 42 is discussed in a later paragraph in conjunction with FIG. 7.

Arms 38 and 39 are positioned parallel to arm 40 and adjacent surface 58 of disc 10. Arms 38 and 39 extend parallel to surface 58 and are located on either side of, and substantially equidistant from, the path of motion 31 of the point of incidence 32 of focused light beams 30.

Magnetic flux relaying shoes 24 and 26 are coupled to support frame 48 of optical platform 86 adjacent arms 38 and 39, respectively. Relaying shoes 24 and 26 are shown as generally L-shaped elements, fabricated of a magnetic material such as iron. They are positioned with respect to arms 38 and 39 such that as optical platform 86 slides radially with respect to disc 10, shoes 24 and 26 maintain small gaps 51 with arms 38 and 39, respectively, typically 0.001–0.002 inch (0.0251–0.051 mm).

Objective lens assembly 59 supports objective lens 65 (not shown), and is a generally cylindrical structure fabricated of a non-magnetic material. The central axis of assembly 59, which is coincident with the optical path of focused beams 30, is normal to surface 58. In the preferred embodiment, assembly 59 includes ring 44 of a magnetic material coupled to the bottom of assembly 59 near surface 58 of disc 10. Relaying shoes 24 and 26 include curved surfaces adjacent ring 44, which surfaces conform to arcuate portions of ring 44 on their respective sides of objective lens assembly 59. The gaps 52 between relaying shoes 24 and 26 and ring 44 are typically 0.005 inch (0.013 mm).

In the operation of electromagnet 21, relaying shoes 24 and 26 function as magnetic circuits to relay the magnetic flux between the first pole piece comprising arm 40 and the second pole pieces comprising arms 38 and 39. The lines of magnetic flux conducted through arms 38 and 39 bridge the narrow gaps 51, are readily conducted through the magnetic circuits comprising relaying shoes 24 and 26, respectively, into ring 44, then pass through disc 10 to arm 40, providing a substantially vertical magnetic field at the point of incidence 32 on surface 58.

Current driver 53 is responsive to control signals from system controller 54 to generate current to coils 55 and 56 of a magnitude and direction to thereby provide a magnetic field of a desired intensity selectively for recording or erasing. Since disc 10 rotates with greater linear velocity near its outer peripheral surface 23 than near its center, the counter magnetic field generated by its eddy currents increases in opposition to the magnetic field generated by electromagnet 21. Thus, in the preferred embodiment, system controller 54 is responsive to the relative radial position of optical platform 86 to cause current driver 53 to supply an increased flow of current to coils 55 and 56 as the focused light beam 30 moves radially outward of disc 10.

Figure 7:
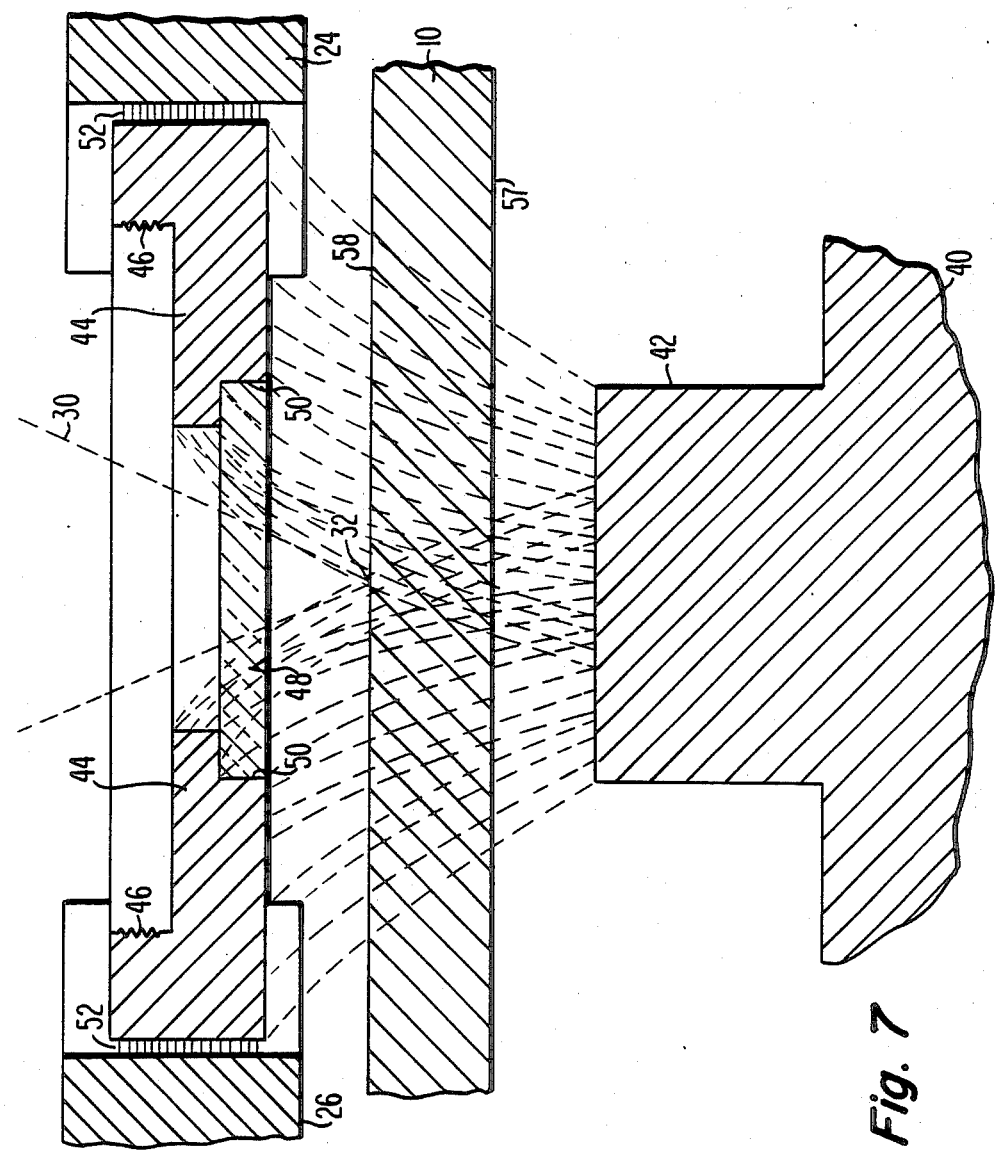
FIG. 7 is a cross-sectional view of the FIG. 6 embodiment, showing detail in the vicinity of the focused light beam.

Referring to FIG. 7, there is shown a cross-sectional view of the FIG. 6 magnetic biasing device in the vicinity of the point of incidence 32 of focused light beams 30. Ring 44, having a generally L-shaped cross section, and fabricated of a magnetic material such as iron, is adapted, typically by threaded surface 46, to be coupled to objective lens assembly 59 (see FIG. 6) adjacent to disc 10. Ring 44 includes a notched groove 50 for cover glass 48, held therein by cementing, illustratively, using an epoxy cement. Ring 44 is closely spaced to shoes 24 and 26, maintaining a gap 52 of approximately 0.005 inch (0.13 mm) therebetween, as objective lens assembly 59 is moved in a direction normal to disc 10 during focusing adjustments.

Arm 40 includes ridge 42 which extends longitudinally along arm 40 in direct alignment with the path of motion described by point of incidence 32 as optical platform 86 translates radially across disc 10 (see FIG. 6). The width of ridge 42 is typically 0.25 inch (6.4 mm), which is the approximate diameter of cover glass 48. In the preferred embodiment, the overall diameter of ring 44 is 0.47 inch (1.2 cm).

The function of ring 44 is to provide a magnetic circuit to relay the magnetic flux from shoes 24 and 26, across narrow gap 52, and closer to the point of incidence 32 of focused light beams 30. The function of ridge 42 on arm 40 is to concentrate flux lines relayed by ring 44 as directly under point 32 as possible. Ridge 42 may typically be spaced from surface 57 of disc 10 by 0.025 inch (0.64 mm). Ring 44 and ridge 42 both serve to increase the density of vertical magnetic field at the point 32 where the record/erase beams 30 are incident. Typically, the outer barrel of the assembly 59 supporting optical elements comprising objective lens 65 is made of brass or aluminum, a nonmagnetic material which does not significantly deflect or impede the path of magnetic flux. Ring 44 additionally reduces the air path of the flux lines between shoes 24 and 26 and arm 40, thereby reducing the energy required of electromagnet 21 to provide a field strength of approximately 300 oersteds at point 32.

Another advantage of concentrating the flux lines of vertical magnetic field generated by electromagnet 21 is the reduction of eddy currents on the surfaces of disc 10. Eddy currents which are induced by the rotation of disc 10 through a magnetic field generate magnetic fields which oppose the field of electromagnet 21, thereby imposing a dragging force on disc 10, requiring more drive energy from motor 14 to maintain the desired rotational speed. Concentration of the flux lines via shoes 24 and 26, ring 44, and ridge 42 on arm 40, reduces the area on disc 10 through which the flux lines pass, thereby reducing the deleterious effect of eddy currents.

While the foregoing description has specified surface 58 of disc 10 as the recording surface having a coating of a magneto-optic material thereon, disc 10 may be a double-sided disc, having magneto-optic coatings on both its planar surfaces 57, 58. An optical recording system employing such a double-sided disc might typically include two opto-electronic systems of the type shown in FIG. 1, and two magnetic biasing apparatus, as detailed in FIG. 6, each pair positioned, illustratively, in diametric opposition across disc 10, each pair processing data on the respective opposing surfaces of disc 10, simultaneously and independent of each other.

While the principles of the present invention have been demonstrated with particular regard to the illustrated structure of the figures, it will be recognized that various departures from such illustrative structure may be undertaken in the practice of the invention. The scope of this invention is therefore not intended to be limited to the structure disclosed herein but should instead be gauged by the breadth of the claims which follow.

What is claimed is:

1. In an optical system for recording information on a disc-shaped record medium, said record medium having a first surface for recording information thereon and having a second surface opposite said first surface, said system including drive means for rotating said record medium about a central axis thereof normal to said first surface, said system additionally including source means for providing a focused beam of light incident on said first surface, said system further including means for establishing radial relative motion between said light beam and said first surface, an apparatus for generating a magnetic field at said first surface adjacent said focused light beam, said apparatus comprising:

an electromagnet having first and second pole pieces, said first pole piece comprising a first arm extending radially of said disc, positioned adjacent said second surface of said disc and aligned with a path of motion described by said focused light beam, said second pole piece comprising a second arm, positioned adjacent said first surface of said disc on the opposite side of said disc from said first arm, said second arm being parallel to said first arm, said second arm being offset from the path of motion described by said focused light beam;

a relaying member, fabricated of a magnetic material, coupled to said means for establishing radial motion, said relaying member positioned in close sliding relation to said second arm, said relaying member relaying magnetic flux between said second pole piece and a position adjacent said focused light beam, wherein the magnetic flux relayed by said relaying member passes substantially vertically between said relaying member and said first pole piece through said disc at a point of incidence on said first surface of said focused light beam; and source means for supplying an electrical current to said electromagnet to thereby provide opposing magnetic polarities in said first and second pole pieces.

2. The apparatus according to claim 1 wherein said second pole piece of said electromagnet further comprises a third arm positioned adjacent said first surface of said disc on the same side of said disc as said second arm, said third arm being parallel to said first and second arms, said third arm being offset from the path of motion described by said focused light beam such that the path of motion of said focused light beam is intermediate and substantially equidistant from said second and third arms, said apparatus further comprising a second relaying member, fabricated of a magnetic material, coupled to said means for establishing radial motion, said second relaying member positioned in close sliding relation to said third arm, said second relaying member relaying magnetic flux between said second pole piece and a position adjacent said focused light beam, wherein the magnetic flux relayed by said second relaying member passes substantially vertically between said second relaying member and said first pole piece through said disc at the point of incidence on said first surface of said focused light beam.

3. The apparatus according to claim 1 wherein said source means for providing a focused beam of light incident on said first surface includes a generally cylindrical objective lens assembly having a longitudinal central axis substantially normal to said first surface, and wherein said relaying member includes a curved surface conforming to an arcuate surface of said cylindrical objective lens assembly and positioned in close proximity thereto.

4. The apparatus according to claim 3 further including an annular member of a magnetic material forming a circumferential surface of said cylindrical objective lens assembly, said annular member being closely proximate said curved surface of said relaying member, wherein the magnetic flux relayed by said relaying member is further relayed to said annular member and passes substantially vertically between said annular member and said first pole piece through said disc at the point of incidence on said first surface of said focused light beam.

5. The apparatus according to claim 1 wherein said first arm includes a ridge extending longitudinally of said first arm adjacent said second surface of said disc, said ridge for concentrating in a narrow area the magnetic flux passing between said relaying member and said first pole piece.

6. The apparatus according to claim 1 wherein said source means for supplying an electrical current includes controlling means for reversing a direction of flow of said electrical current and for adjusting a magnitude of said electrical current.

7. The apparatus according to claim 6 wherein said controlling means provides increased current flow to said electromagnet as said focused beam of light is moved radially outward of said disc.

8. An optical system for recording information on a disc-shaped record medium, said record medium having a first surface for recording information thereon and having a second surface opposite said first surface, said system comprising:

drive means for rotating said record medium about a central axis thereof normal to said first surface;

source means for providing a focused beam of light incident on said first surface;

means for establishing radial relative motion between said light beam and said first surface; and means for generating a magnetic field at said first surface adjacent said focused light beam, said generating means including an electromagnet having first and second pole pieces, said first pole piece comprising a first arm extending radially of said disc, positioned adjacent said second surface of said disc and aligned with a path of motion described by said focused light beam, said second pole piece comprising a second arm, positioned adjacent said first surface of said disc on the opposite side of said disc from said first arm, said second arm being parallel to said first arm, said second arm being offset from the path of motion described by said focused light beam, said generating means further including a relaying member, fabricated of a magnetic material, coupled to said means for establishing radial motion, said relaying member positioned in close sliding relation to said second arm, said relaying member relaying magnetic flux between said second pole piece and a position adjacent said focused light beam, wherein the magnetic flux relayed by said relaying member passes substantially vertically between said relaying member and said first pole piece through said disc at a point of incidence on said first surface of said focused light beam, said generating means further including source means for supplying an electrical current to said electromagnet to thereby provide opposing magnetic polarities in said first and,second pole pieces.

9. The system according to claim 8 wherein said second pole piece of said electromagnet further comprises a third arm positioned adjacent said first surface of said disc on the same side of said disc as said second arm, said third arm being parallel to said first and second arms, said third arm being offset from the path of motion described by said focused light beam such that the path of motion of said focused light beam is intermediate and substantially equidistant from said second and third arms, said apparatus further comprising a second relaying member, fabricated of a magnetic material, coupled to said means for establishing radial motion, said second relaying member positioned in close sliding relation to said third arm, said second relaying member relaying magnetic flux between said second pole piece and a position adjacent said focused light beam, wherein the magnetic flux relayed by said second relaying member passes substantially vertically between said second relaying member and said first pole piece through said disc at the point of incidence on said first surface of said focused light beam.

10. The system according to claim 8 wherein said source means for providing a focused beam of light incident on said first surface includes a generally cylindrical objective lens assembly having a longitudinal central axis substantially normal to said first surface, and wherein said relaying member includes a curved surface conforming to an arcuate surface of said cylindrical objective lens assembly and positioned in close proximity thereto.

11. The system according to claim 10 further including an annular member of a magnetic material forming a circumferential surface of said cylindrical objective lens assembly, said annular member being closely proximate said curved surface of said relaying member, wherein the magnetic flux relayed by said relaying member is further relayed to said annular member and passes substantially vertically between said annular member and said first pole piece through said disc at the point of incidence on said first surface of said focused light beam.

12. The system according to claim 8 wherein said first arm includes a ridge extending longitudinally of said first arm adjacent said second surface of said disc, said ridge for concentrating in a narrow area the magnetic flux passing between said relaying member and said first pole piece.

13. The system according to claim 8 wherein said source means for supplying an electrical current includes controlling means for reversing the direction of flow of said electrical current and for adjusting the magnitude of said electrical current.

14. The system according to claim 13 wherein said controlling means provides increased current flow to said electromagnet as said focused beam of light is moved radially outward of said disc.

15. The system to claim 8 wherein said first surface of said record medium includes a coating of a magneto-optic substance for effecting reversible recordings thereon.

16. The system according to claim 15 wherein said second surface of said record medium additionally includes a coating of a magneto-optic substance for effecting reversible recordings thereon.

17. The system according to claim 8 wherein said source means for providing a focused beam of light incident on said first surface includes a laser diode array.

18. The system according to claim 8 wherein said source means for providing a focused beam of light incident on said first surface includes a two-axis actuator.

19. The system according to claim 8 wherein said means for establishing radial relative motion includes a linear motor.

* * * * *